United States Patent [19]
Monaghan et al.

[11] Patent Number: 5,735,955
[45] Date of Patent: Apr. 7, 1998

[54] APPARATUS FOR GENERATING AND DISPERSING FOAM HERBICIDE WITHIN A SEWER

[75] Inventors: James D. Monaghan; Kenneth Line, both of Salem, Oreg.

[73] Assignee: General Chemical Company, Salem, Oreg.

[21] Appl. No.: 419,571

[22] Filed: Apr. 8, 1995

[51] Int. Cl.$^6$ .................... B08B 9/04; B05B 13/06
[52] U.S. Cl. .................... 118/317; 118/DIG. 11; 118/323; 118/600; 134/167 C; 134/24; 134/36; 134/168 C; 134/169 C; 134/172
[58] Field of Search .................. 118/DIG. 11, 3, 118/17, 323, 600; 134/22.13, 24, 36, 167 C, 168 C, 169 C, 172; 422/133

[56] References Cited

U.S. PATENT DOCUMENTS

| | | | |
|---|---|---|---|
| 3,199,790 | 8/1965 | Giesemann | 422/133 |
| 3,232,709 | 2/1966 | Cole, II | 422/133 |
| 4,025,360 | 5/1977 | Horne et al. | 134/167 C |
| 4,213,936 | 7/1980 | Lodrick | 422/133 |
| 4,263,166 | 4/1981 | Adams | 422/133 |
| 4,944,320 | 7/1990 | Waite et al. | |
| 4,981,524 | 1/1991 | Waite | |

*Primary Examiner*—Donald E. Czaja
*Assistant Examiner*—Calvin Padgett
*Attorney, Agent, or Firm*—Suiter & Associates PC

[57] ABSTRACT

An apparatus and method are disclosed for producing and dispersing herbicidal foam within a sewer line in such a manner as to apply the foam to either the entire interior surface or a specific or a plurality of specific areas within a generally cylindrical line.

23 Claims, 9 Drawing Sheets

5,735,955

APPARATUS FOR GENERATING AND DISPERSING FOAM HERBICIDE WITHIN A SEWER

SPECIFICATION

1. Technical Field

The present invention is directed generally to an improved herbicide application method, more particularly to an apparatus designed to produce and distribute a dense foam within a sewer line.

2. Background

Sewer lines are prone to developing leaks. Especially susceptible are lines near high traffic roadways and those in areas where earth tremors are common. Breaches in sewer lines are often penetrated by roots which eventually clog or rupture the lines, necessitating removal and replacement. This procedure is costly, disruptive and typically results in the destruction of overlying surface plantings.

Various herbicidal application methods have been employed to avert vegetative damage to sewer lines. For local applications the prior art teaches flushing an herbicide down a toilet upstream from sewer lines where vegetation may potentially invade.

In large industrial and urban sewer systems an herbicidal detergent solution may be introduced through a hose connected to a high pressure air source. The resulting dense foam acts as a carrying agent and brings the solution in contact with the offending vegetation long enough to accomplish its purpose. Although this method is effective it requires a large amount of herbicide, rendering it expensive and environmentally suspect.

Also known to the art are several other methods of treating sewer lines compromised by root growth. In U.S. Pat. No. 5,069,706 and U.S. Pat. No. 5,062,87, Tobiason teaches a method of employing a foaming agent to flush a sewer line with a suitable herbicide; Tobiason, U.S. Pat. No. 5,165,434, discloses an apparatus for locating and then poisoning root infestations within sewer lines; Tobiason, U.S. Pat. No. 5,264,146, discloses a compound and method for clearing sludge and the like from sewer lines; Tobiason, U.S. Pat. No. 5,361,512, discloses a method and apparatus for producing a phytocidal gas for inhibiting the growth of flora within a sewer line; and Tobiason U.S. Ser. No. 08/311,653, discloses an adherent herbicidal gel composition and alternative methods of dispersing the same through a sewer line. While all of these inventions describe novel and effective solutions to various sewer line problems, none is a panacea.

Sewer lines are damp places intermittently filled with fast moving waste water. Rapid flow and accompanying debris tend to scrub away herbicides applied to root infestations in the sewer line. Sewer lines come in a variety of shapes and sizes: a continuous length may fluctuate in shape, grade, and diameter, while older lengths of line may become partially collapsed or separated, leaving large gaps which may accumulate excessive herbicide during or shortly after treatment. Additionally, lines left untreated for some time may become partially or completely filled with vegetation, compromising treatment efforts as well as water flow. For these and other reasons, it is a primary object of the present invention to provide a method and apparatus for generating and thoroughly dispersing an adherent herbicidal composition throughout even irregular and heavily penetrated sewer lines.

Another object of the present invention is to provide a method and apparatus allowing delivery of a controlled amount of herbicidal foam to the interior surface of a sewer line.

Another object of the present invention is to provide a method and apparatus for applying herbicide to the entire internal surface of a targeted sewer line segment.

Still another object of the present invention is to provide an economical method and apparatus for inhibiting the growth of vegetation in sewer lines.

Still another object of the present invention is to provide an easily used method and apparatus for inhibiting the growth of vegetation in sewer lines.

Yet another object of the present invention is to provide a method and apparatus for inhibiting the growth of vegetation in sewer lines while minimizing damage to the overlying surface vegetation.

Yet another object of the present invention is to provide a method and apparatus for inhibiting the growth of vegetation in sewer lines while minimizing secondary environmental damage.

Other objects, advantages and novel features of the present invention will become apparent from the following detailed description of the invention, when considered in conjunction with the drawings.

SUMMARY OF THE INVENTION

The present invention discloses both a method and apparatus for applying herbicidal foam to the entire interior surface of a sewer line, thereby coating any invading floral growth.

The apparatus for applying an herbicidal foam composition consists of an herbicidal foam production unit equipped with a 360 degree spray nozzle. The production unit is connected to a water source through a hose which delivers water needed for the herbicidal foam and additionally serves as the means for guiding the foam production unit through the infested length of line.

Treatment of a segment of sewer line begins with extension of a length of hose between two access ports bounding the infested area. Initial placement of the hose within the targeted length of sewer line is accomplished by attaching a jetter nozzle and applying water pressure. Water advancing through the hose is propelled backward by the jetter nozzle, allowing the hose to travel quickly through the sewer line. The hose is captured at a bounding access port and the herbicidal foam production unit is attached. Under continuous pressure the hose and production unit are pulled back to the original access port, allowing uniform dispersal of the foam product through the spray nozzle of the production unit. In this fashion the hose and production unit may be employed to treat any length of infested line bounded by two access ports.

BRIEF DESCRIPTION OF THE DRAWINGS

FIGS. 8A and 8B are elevational cross sections of an exemplary cartridge of FIG. 7 wherein FIG. 8A illustrates a cartridge with a first chamber loaded, and wherein FIG. 8B illustrates the same cartridge having its second chamber loaded and sealed;

DESCRIPTION OF A PREFERRED EMBODIMENT

I. Herbicidal Foam Production Unit

Figure 1:
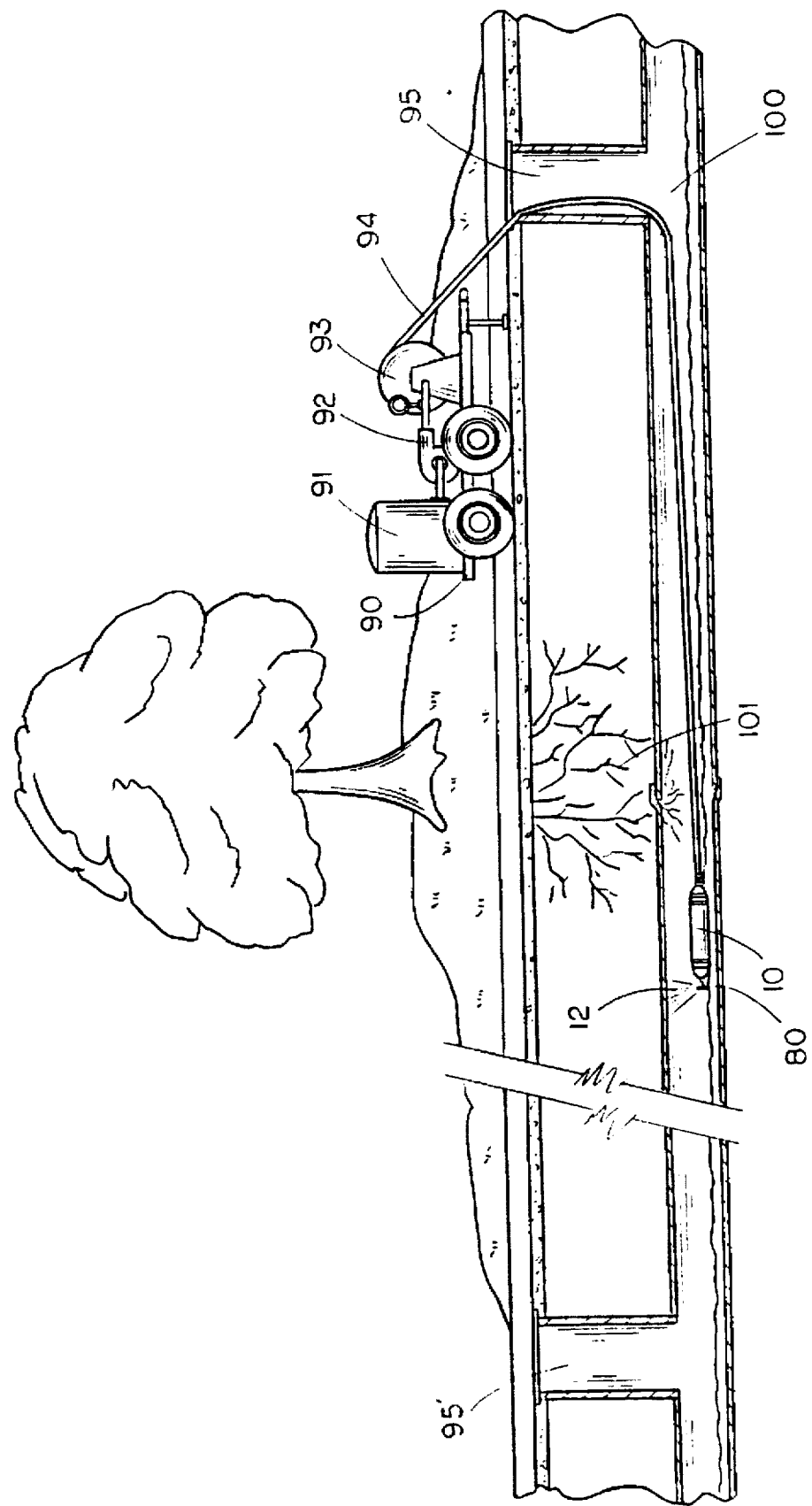
FIG. 1 is a full sectional elevational view of a sewer line showing how the foam production unit and attached dispensing nozzle may be moved through a sewer line while herbicidal foam is dispersed.
Figure 2:
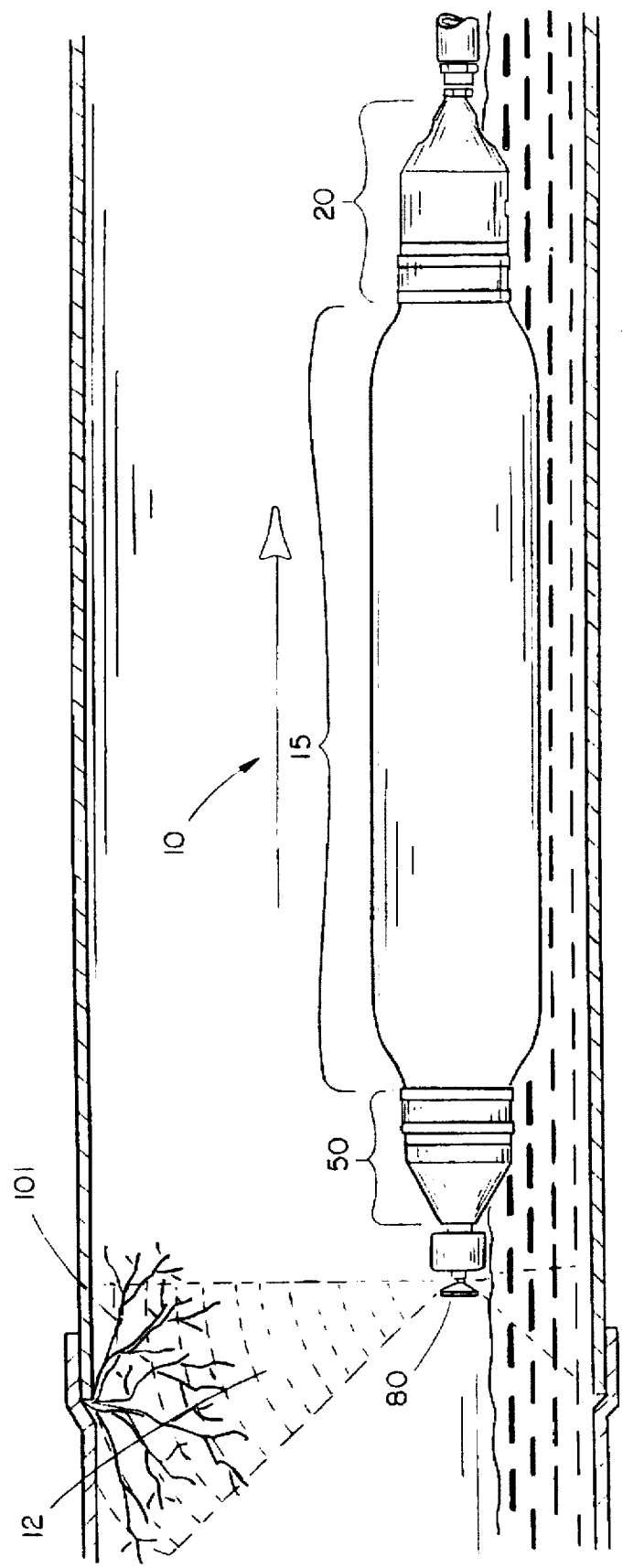
FIG. 2 is an enlarged partial sectional view showing the range and angle at which herbicidal foam is propelled from the dispensing nozzle, in this case coating a floral infestation.
Figure 3:
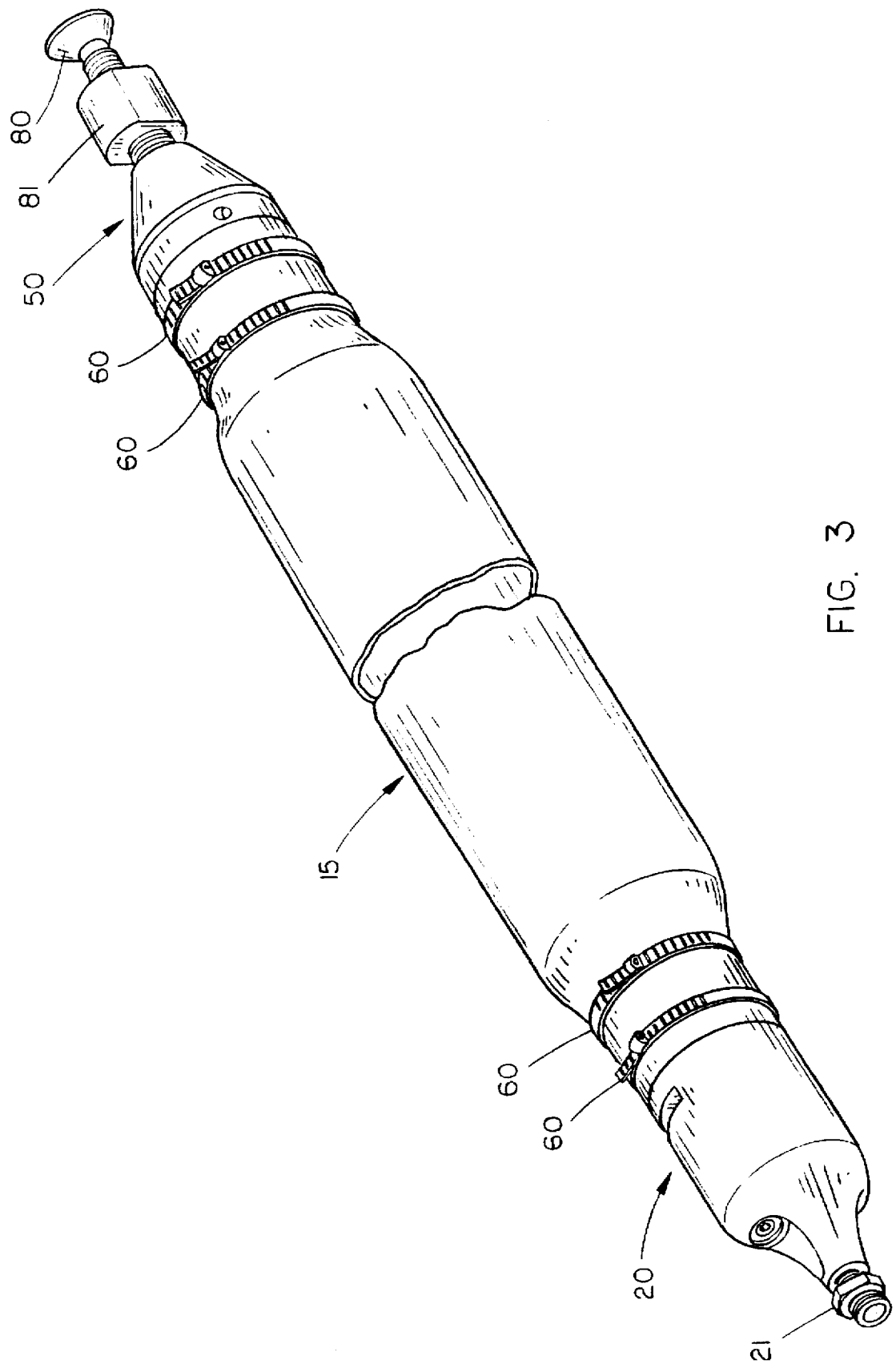
FIG. 3 is a perspective view of the herbicidal foam production unit and dispensing nozzle.

A preferred embodiment of the present invention is illustrated in FIGS. 1 through 6. The described embodiment of the apparatus of the invention may be used to practice the method of the invention. Turning to the figures, wherein like reference numerals refer to like components, FIG. 1 illustrates a typical application and FIGS. 2 through 6 illustrate major assemblies and components of the present invention.

For ease in transporting the apparatus and related equipment to a job site (FIG. 1), a towable trailer (90) is anticipated. Mounted on the trailer is a standard sewer jetter unit consisting of a water reservoir (91), pump (92), hose (94) and reel assembly (93). Since water pressure from a standard sewer jetter unit generally exceeds the requirements of the foam production unit (10), a secondary low-pressure bypass system (not pictured) should be installed on the sewer jetter.

Placement of the hose (94) through the infested length of line (100) is initiated by affixing a jetter nozzle (not pictured) and feeding the combination through an access port (95) to the sewer line (100). Pressurization of the hose (94) will cause water to exit the jetter nozzle and propel the combination past any floral infestations (101). Upon retrieval of the hose and jetter nozzle from a bounding access port (95'), the jetter nozzle is detached and replaced with an adaptor (not pictured) allowing linkage of the hydro cleaner hose (94) and the foam production unit (10). Under continuous water pressure, the combination (94)(10) is then guided back through the sewer line (100) by reeling in the hose (94) until the combination reaches the original access port (95). As the foam production unit (10) proceeds through the line (100), chemicals within the production unit (10) react with the pressurized water to form an herbicidal foam (12) which is continuously propelled through the nozzle (80) of the unit, coating the entire circumference of the sewer line and any encroaching vegetation (101). The spray nozzle (80; 84) may be altered in order to accommodate changes in pipe sizes, volumes, pressures, viscosity, and unit velocities. Upon completion of line treatment the foam production unit (10) is retrieved from the original access port (95), detached from the hydro cleaner hose (94) and all components are flushed with water prior to storage.

The foam production unit (FIG. 2)(10) is primarily comprised of three main sections: the foam production cell (15), inlet end cap (20) and outlet end cap (50). The unit is assembled and filled with an herbicide and foaming agent prior to its attachment to the hydro cleaner hose. Assembly requires only simple tools.

A. Inlet End Cap

Figure 4:
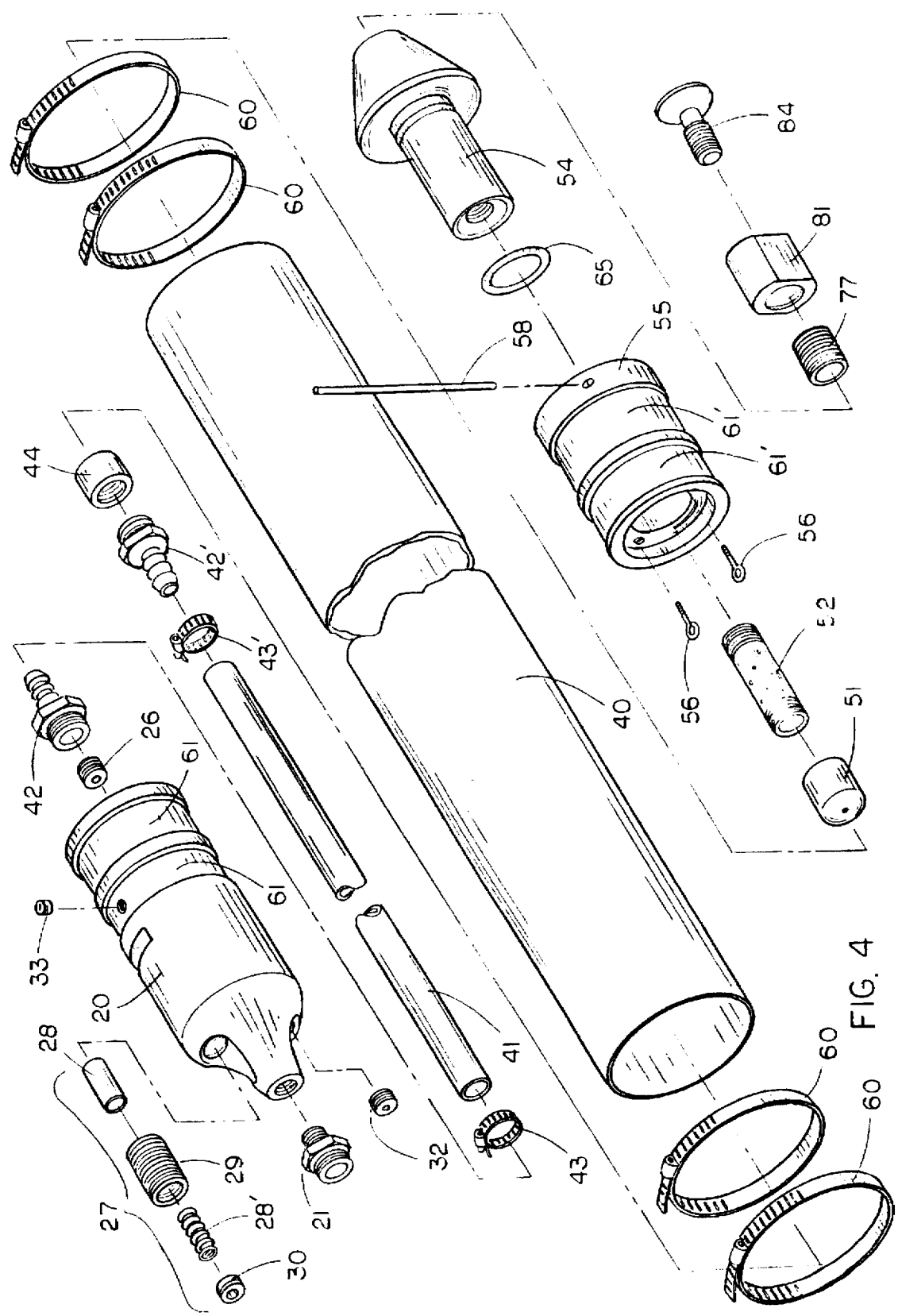
FIG. 4 is a perspective exploded view of the herbicidal foam production unit and dispensing nozzle.
Figure 5:
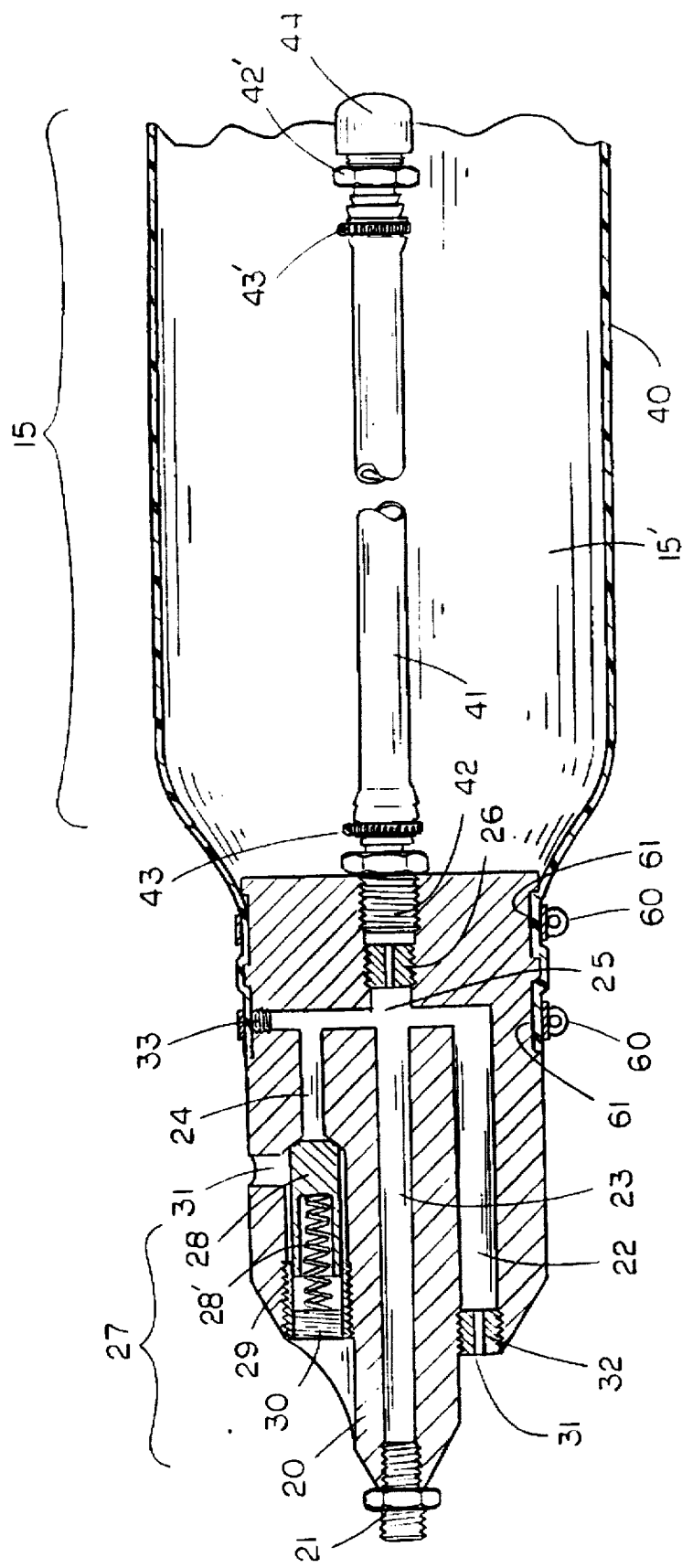
FIG. 5 is a side elevational cross section view of the posterior end of the foam production unit showing the exterior hose, metering hose and components of the inlet end cap.
Figure 6:
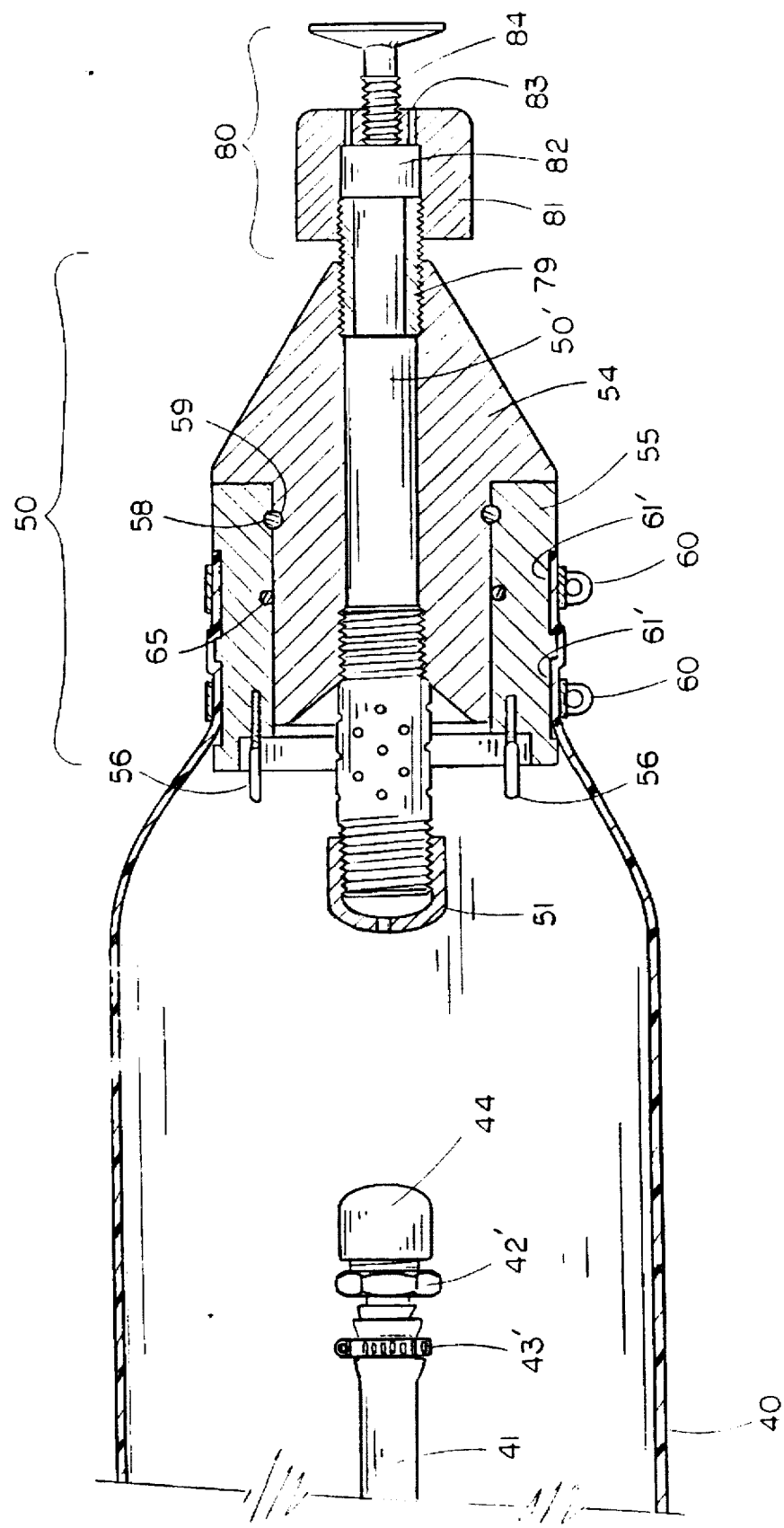
FIG. 6 is a side elevational cross section view of the anterior end of the foam production unit showing the metering hose, filter, components of the outlet end cap and nozzle assembly.

In a preferred embodiment (FIGS. 3, 4 and 5) the inlet end cap (20) is a generally cylindrical metallic structure with a tapered neck joined to the hydro cleaner hose adaptor (not pictured) by a hose coupler union (21). Water entering the inlet end cap (20) through the hose coupler union (21) flows into the first (24), second (22) and center (23) prongs of a three pronged generally fork-shaped manifold (25)(FIG. 5). Once within the manifold (25) the water moves forward into the foam production cell (15) through an orifice plug (26) which regulates fluid flow into the metering hose (41). Orifice plugs (26 and 32) allow water to flow from chamber (20) at a rate which, with a given volume entering the hose coupler union (21), cause a given pressure in chamber (20). If the target pressure is exceeded in the chamber (20) the check valve (27) will compensate by releasing additional water.

The first (24) of the two outside prongs of the manifold system (25) is equipped with a simple check valve (27) designed to open under high pressure conditions. The valve (27) is comprised of a reducer bushing (29) containing a spring (28') and poppet (28) held in place within the reducer bushing (29) by a check valve adjusting screw (30). This assembly is inserted into the exit portal of the first manifold prong. Water pressure in excess above the operating pressure exerted on the face of the poppet (28) causes the spring to compress allowing the poppet (28) to slide back toward the valve adjusting screw (30). As the poppet moves back a pressure relief orifice (31) is exposed through which water exits until pressure from the hydro cleaner drops below the critical point and the poppet (28) moves forward covering the pressure relief orifice (31). It will be noted that another plug (33), adjacent to this prong of the manifold, permanently closes a drill hole required to bore the perpendicular arm of the manifold.

The second outside prong (22) is fitted at its opening with a removable plug (32) having a center hole (31) parallel with the manifold prong. The hole (31) in the orifice plug (32) regulates the amount of water allowed to enter the foam production area. Similar plugs (32) with different hole sizes may be substituted to regulate the amount of water exiting the manifold (25).

B. Foam Production Cell

Production of herbicidal foam is accomplished within the bounds of an ironsides hose (40) (FIGS. 3, 5 and 6) having tapered ends and extending between the inlet and outlet end caps (20, 50). The ironsides hose (40) partially extends over each end cap (20, 50), and is secured by two sets of standard hose clamps (60) fitted within circumferential parallel grooves (61, 61') at each tapered end. The metering hose (41) extends through the center of the ironsides hose (40), its exact length determined by foam production parameters. The metering hose (41) is attached at one end to the inlet end cap (20) manifold system through use of a hose barb (42) and a small hose clamp (43). The free end is closed with a hose barb (42'), hose clamp (43') and end cap (44) and may be attached to one of the eye bolts (56) via suitable means.

The metering hose (41) is made from a permeable material designed to allow 1.0 to 1.5 gallons ($\approx$) per minute into the reaction cell (15') at approximately 70 pounds per square inch ($\approx$70.0 p.s.i.). As the water enters the reaction chamber (15') it comes into contact with the herbicide and foaming agents, creating a dense herbicidal foam.

C. Outlet End Cap

The outlet end cap (50) (FIGS. 3, 4 and 6) is a generally cylindrical metallic structure tapering at its distal end to a nozzle. Its three main structural elements are a housing piece (55), outlet plug (54) and nozzle component (80). The generally cylindrical housing (55) fits within the tapered distal end of the ironsides hose (40) and is secured by two hose clamps (60) held in place by recessed grooves (61'). Two eye bolts (56) are seated in the proximal end of the housing (55), extending into the reaction cell (15'). When required, these eye bolts (56) allow an operator to stabilize the metering hose (41) by wrapping a string around the end cap (44) of the metering hose and tying each string end to an eyebolt (56). Within the housing (55) is seated the outlet plug (54) which is held in place by a nylatron rod (58) in a keeper groove (59). An "O" ring (65) maintains the seal between the plug and the housing. The outlet plug has a hollow core (50') which at its proximal end is threaded to accept a capped (51) filter tube (52) having a plurality of small apertures. The capped end of the filter tube (52) protrudes into the reaction cell (15') and admits the foam to the hollow core (50') of the outlet plug (54). The threaded, removable filter tube cap (51) may have at least one aperture of variable size. The distal end of the outlet plug core (50') is also threaded to accept a nipple (79) on which is mounted a nozzle body (81).

It will be understood that a spring operated valve (with a line infestation sensor or the like) may be employed such that the foam output of the apparatus (10) (herbicidal foam production unit) increases where the sewer line (100) is constricted by vegetation. For example, a generally C-shaped snag bar might be connected to a spring valve mounted within the outlet end cap [50; e.g., outlet plug core (50')] such that the snag bar is operatively curved away from the direction of travel of the apparatus and such that in normal operation foam generation is minimized so long as the snag bar is not deflected by restrictive vegetation thereby causing the spring valve opening to be increased so as to increase foam production commensurate to sewer line vegetation density.

II. Herbicidal Foam Production Process

A. Herbicidal Foam Production Composition

The herbicidal foam production composition (RootX™) is available from General Chemical Company of Salem, Oreg. RootX™ is manufactured under at least one of the following U.S. Pat. Nos.: 5,062,878 and 5,069,706. In an exemplary formulation for use in the applicator (10) of the present invention, the composition contains by weight: 40 parts sulfamic acid ($HSO_3NH_2$); 36 parts sodium bicarbonate; 10 parts kaolin clay; 1 part 2,6-dichlorobenzonitrile; 1 part octylphenoxypolyethoxyethanol; and 1 part coconut oil reaction product.

B. Refill Cartridge (FIGS. 7 through 10)

Figure 7:
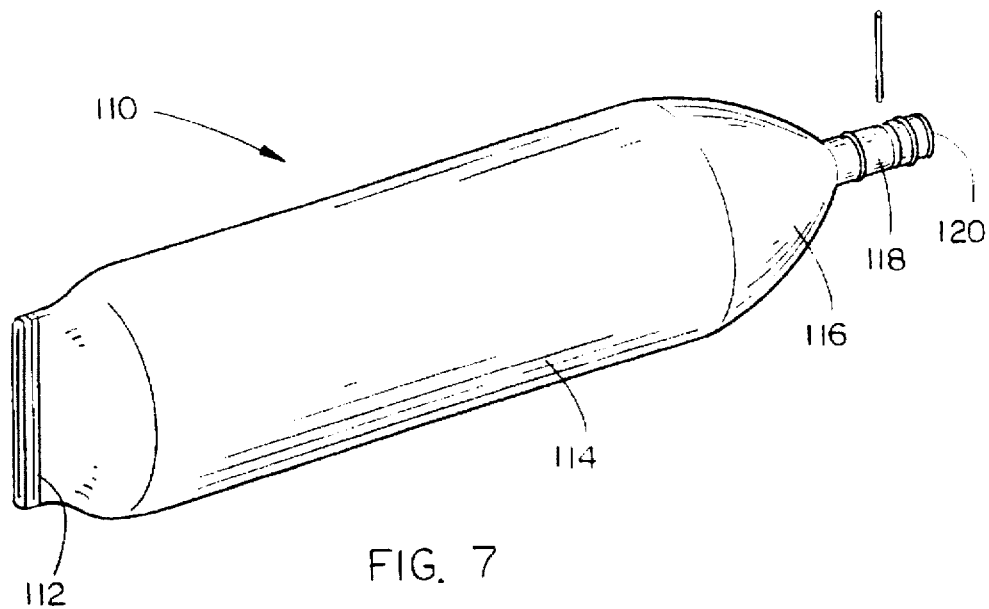
FIG. 7 is a perspective view of an exemplary cartridge for loading the herbicidal foam production unit with herbicidal foam producing composition.
Figure 8A:
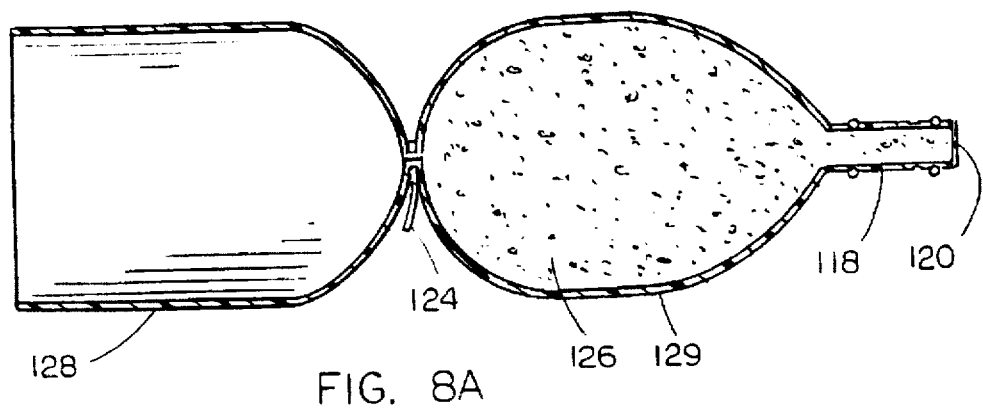
Figure 8B:
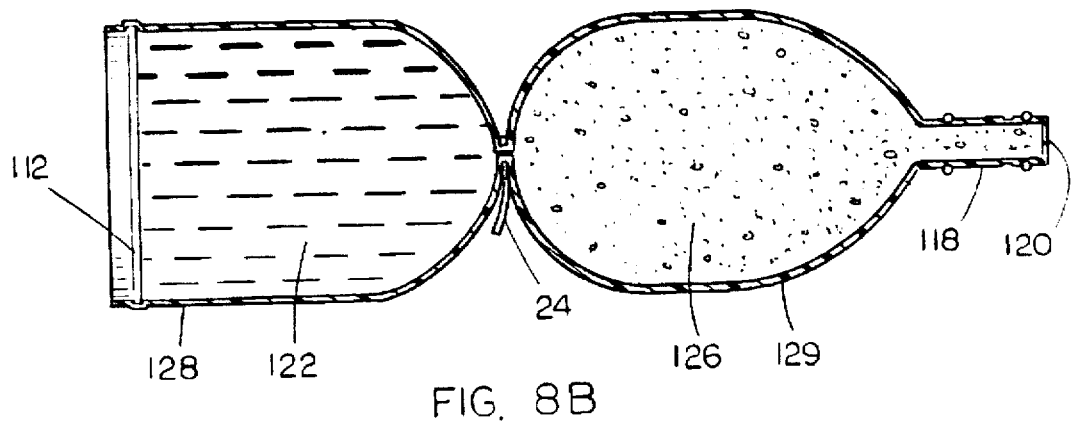
Figure 9A:
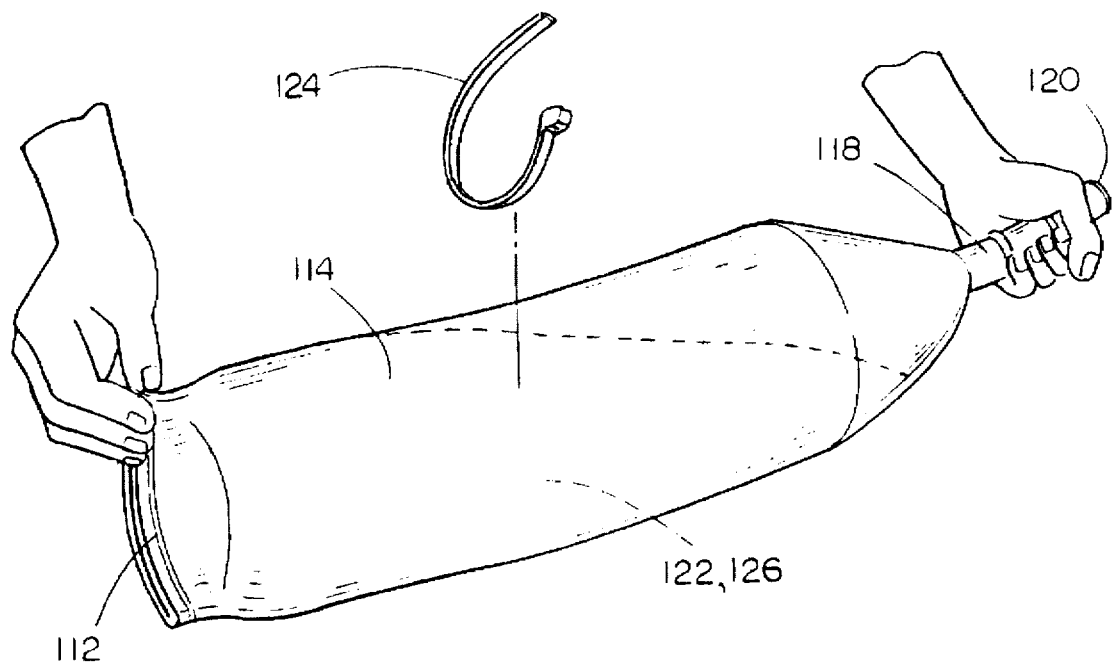
FIGS. 9A and 9B are perspective views illustrating an exemplary method of mixing the contents of the two cartridge chambers (FIGS. 8A and 8B) prior to use.
Figure 9B:
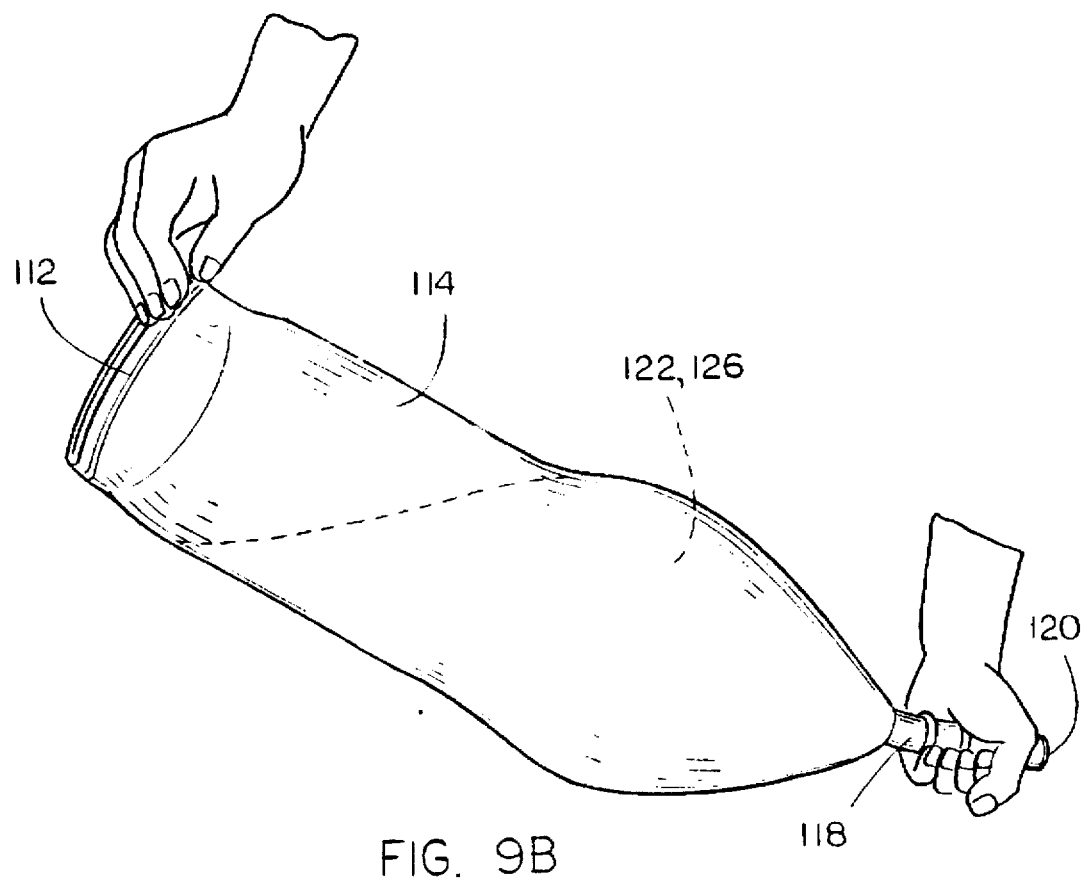
Figure 10:
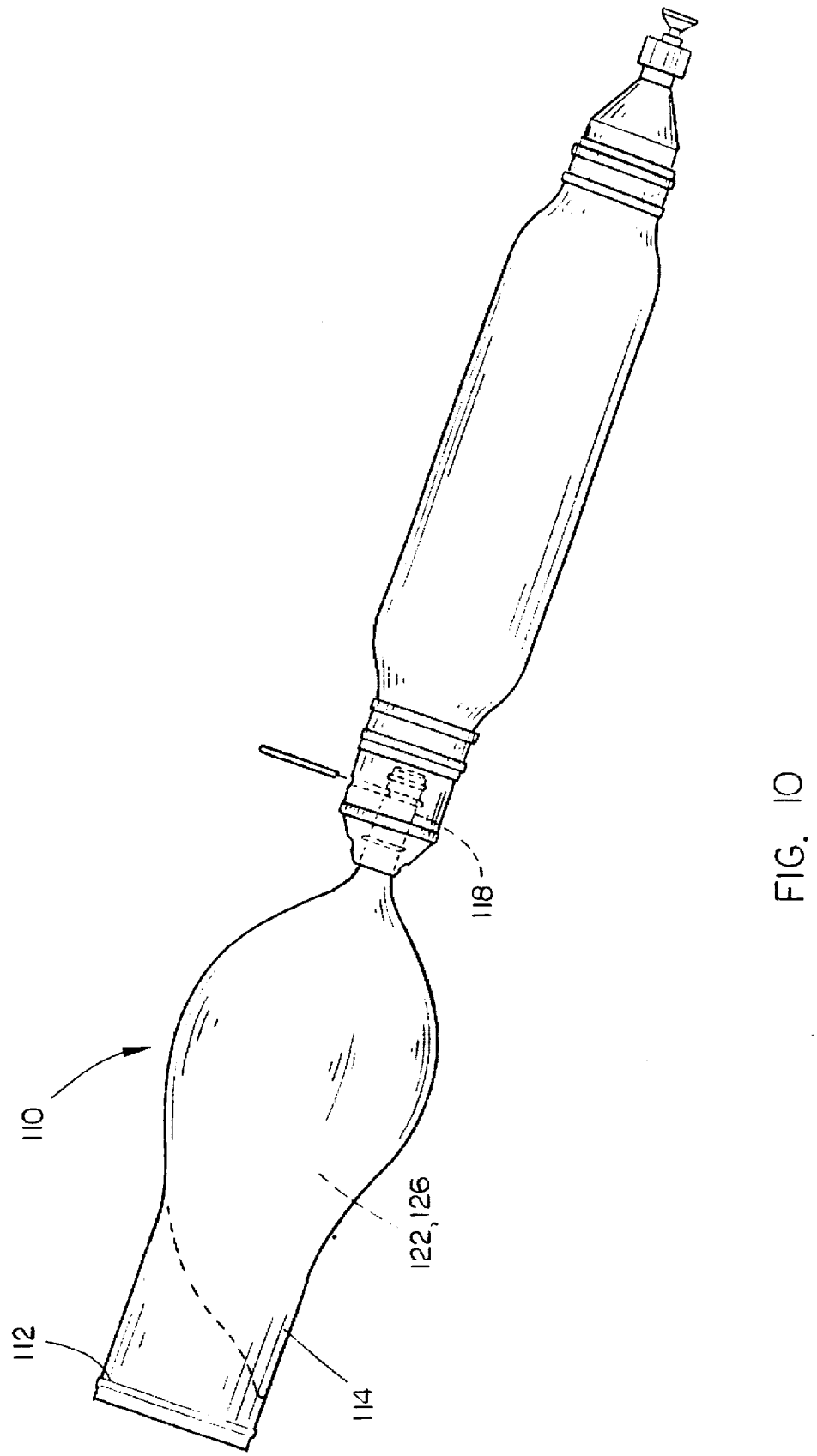
FIG. 10 is a perspective view of a an exemplary cartridge being utilized to fill the herbicidal foam production unit with herbicidal foam producing composition.

In operation the herbicidal foam production unit (10) may be filled with a two part herbicidal foam production composition (such as RootX™). The flexible foam production cell (15) may be filled via a refill cartridge (110; FIG. 7). The locking pin (58; FIG. 4) may be removed so as to allow the transfer tube (120; FIG. 7) of the refill cartridge (110; FIG. 7) to be inserted and locked into place.

C. Features of the Present Invention

Since the clinging high density foam is produced by the production unit the sewer line being treated may remain in service during treatment operations. The applicator applies the foam under pressure serving to inject any root masses with the herbicidal mixture. In addition to allowing the unit to be utilized in varying sewer flow conditions, the high pressure also allows the unit to be utilized in lines with steep grades. Application of foam (with spray foam methodology) also results in coverage of sewer line laterals.

The herbicidal production unit (10) may be utilized in combination with a swab, trowel, or brush in order to extend dispersal and coverage. In such an operation a swab, trowel, or brush may be attached to and pulled via the unit (10). In an exemplary embodiment the swab may be conical in shape such that material is carried to the line wall. The swab (sponge) may be filled with a herbicide mixture.

Additionally, the quantity of the herbicidal mixture may be varied by altering: (1) the velocity of the unit, (2) the amount of water entering the unit, (3) the orifice size, and (4) the pressure on materials that are inside the device.

The unit (10) chamber (40) is preferably manufactured from a flexible tubing so as to allow the unit (10) to be readily inserted and removed from a manhole. Likewise, the unit (10) may negotiate vertical and/or horizontal bends in a sewer line. However, the unit (10) becomes semi-rigid when pressurized and can be pushed as well as pulled through pipelines. The unit (10) may be easily constructed in varying diameters and lengths to accommodate varying and extreme changes in pipe lengths, diameters and conditions.

When supplied with water of sufficient pressure and volume, such as from a sewer jetter, the excess water exiting the unit (10) causes a vacuum to form which serves to cause the dense herbicidal foam to travel from the foam spray head toward the vacuum. This action extends foam coverage.

The device may also be used for intermittent application by shutting the water source on or off. Because of this, herbicide may be applied, in conjunction with a video camera, to specific root masses.

Thus, it is apparent there has been provided, in accordance with the invention, a herbicidal foam production system which satisfies the objects, aims, and advantages set forth before. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An apparatus for applying a foam coating to the interior of a generally cylindrical line, said apparatus comprising:
    a pressurized source of liquid;
    an intake manifold connected to said source of pressurized liquid, said intake manifold comprising a plurality of chambers;
    a foam production chamber connected to an outlet of said intake manifold, said foam production chamber comprising an outer vessel forming a reaction chamber for foam production and an internal metering hose permeable to said liquid for receiving the pressurized liquid from said intake manifold, said foam production chamber for accepting the pressurized liquid and combining the pressurized liquid with coating and foaming materials to produce a pressurized foam coating; and
    an output chamber connected to an outlet of said foam production chamber, said output chamber for accepting the resulting pressurized foam coating and propelling it through a nozzle assembly attached to said output chamber to disperse the foam coating against the walls of a generally cylindrical line.

2. The apparatus according to claim 1 wherein said intake manifold comprises a first chamber comprising a feed line connected to an inlet of said foam production chamber and a second chamber operably connected to said first chamber, said second chamber comprising a means positioned and arranged for regulating fluid pressure in the intake manifold.

3. The apparatus according to claim 2 wherein said intake manifold comprises a first chamber comprising a feed line to said foam production chamber, a second chamber comprising a means for regulating fluid flow into the foam production chamber, and a third chamber comprising a means positioned and arranged for regulating fluid pressure in the intake manifold, wherein said first, second, and third chambers are operably connected to each other.

4. The apparatus according to claim 3 wherein said means for regulating fluid flow into the foam production chamber comprises an orifice plug.

5. The apparatus according to claim 4 wherein said means for regulating fluid pressure in the intake manifold comprises a pressure activated check valve.

6. The apparatus according to claim 3 wherein said means for regulating fluid pressure in the intake manifold comprises a pressure activated check valve.

7. The apparatus according to claim 1 wherein said intake manifold comprises a first chamber comprising a feed line connected to an inlet of said foam production chamber, and a second chamber operably connected to said first chamber, said second chamber comprising a means positioned and arranged for regulating fluid flow into the flow production chamber.

8. The apparatus according to claim 1 wherein said liquid is water.

9. The apparatus according to claim 8 wherein said permeable metering hose has a permeability of about 1.0 to about 1.5 gallons per minute at a water pressure of about 70 p.s.i.

10. The apparatus according to claim 1 wherein the nozzle sprays in a substantially 360° circumference.

11. The apparatus according to claim 1 further comprising a premixed formulation of foaming and coating materials.

12. The apparatus according to claim 1 wherein said nozzle assembly further comprises a spring operated valve and wherein the apparatus further comprises a snag bar connected to said spring operated valve wherein said snag bar may be deflected by vegetation within said line to operate said spring valve.

13. An apparatus for applying a foam coating to the interior of a generally cylindrical line, said apparatus comprising:

a pressurized source of liquid;

an intake manifold connected to said source of pressurized liquid, said intake manifold comprising a plurality of chambers;

a foam production chamber connected to an outlet of said intake manifold, said foam production chamber to accept the pressurized liquid from the intake manifold and combine it with coating and foaming materials to produce a pressurized foam coating; and an output chamber connected to an outlet of said foam production chamber, said output chamber for accepting the resulting pressurized foam coating from the foam production chamber and propelling it through a nozzle assembly attached to said output chamber to disperse the foam coating against the walls of a generally cylindrical line;

wherein said nozzle assembly further comprises a spring operated valve and wherein the apparatus further comprises a snag bar connected to said spring operated valve wherein said snag bar may be deflected by vegetation within said line to operate said spring valve.

14. The apparatus according to claim 13 wherein said intake manifold comprises a first chamber comprising a feed line connected to an inlet of said foam production chamber and a second chamber operably connected to said first chamber, said second chamber comprising a means positioned and arranged for regulating fluid pressure in the intake manifold.

15. The apparatus according to claim 14 wherein said intake manifold comprises a first chamber comprising a feed line to said foam production chamber, a second chamber comprising a means for regulating fluid flow into the foam production chamber, and a third chamber comprising a means positioned and arranged for regulating fluid pressure in the intake manifold, wherein said first, second, and third chambers are operably connected to each other.

16. The apparatus according to claim 15 wherein said means for regulating fluid flow into the foam production chamber comprises an orifice plug.

17. The apparatus according to claim 16 wherein said means for regulating fluid pressure in the intake manifold comprises a pressure activated check valve.

18. The apparatus according to claim 15 wherein said means for regulating fluid pressure in the intake manifold comprises a pressure activated check valve.

19. The apparatus according to claim 13 wherein said intake manifold comprises a first chamber comprising a feed line connected to an inlet of said foam production chamber, and a second chamber operably connected to said first chamber, said second chamber comprising a means positioned and arranged for regulating fluid flow into the flow production chamber.

20. The apparatus according to claim 13 wherein said liquid is water.

21. The apparatus according to claim 13 wherein said foam production chamber comprises an outer vessel forming a reaction chamber for foam production and an internal metering hose permeable to said liquid for receiving the pressurized liquid from said intake manifold, and wherein said internal metering hose has a permeability of about 1.0 to about 1.5 gallons per minute at a water pressure of about 70 p.s.i.

22. The apparatus according to claim 13 wherein the nozzle sprays in a substantially 360° circumference.

23. The apparatus according to claim 13 further comprising a premixed formulation of foaming and coating materials.

* * * * *